United States Patent
Pierce

[15] 3,684,311
[45] Aug. 15, 1972

[54] MUDGUARD ATTACHMENT FOR AUTOMOBILES

[72] Inventor: Ray S. Pierce, 3821 Vineyard Road, Kansas City, Mo. 64128

[22] Filed: Nov. 2, 1970

[21] Appl. No.: 85,863

[52] U.S. Cl. ............................. 280/152 R, 280/163
[51] Int. Cl. ............................................... B62b 9/16
[58] Field of Search ....280/163, 152, 150 R; 296/1 R

[56] References Cited

UNITED STATES PATENTS

| | | | |
|---|---|---|---|
| 2,559,755 | 7/1951 | Bratz | 280/152 R |
| 1,972,283 | 9/1934 | Zimmers | 280/163 |

*Primary Examiner*—Benjamin Hersh
*Assistant Examiner*—Robert R. Song
*Attorney*—John A. Hamilton

[57] ABSTRACT

A mudguard attachment for automobiles, the sides of the bodies of which curve transversely inwardly at their lower edge portion, said attachment comprising a step member resembling a running board adapted to be extended horizontally along the side of a car body at the lower edge thereof, being secured at its inner edge to said car body and extending transversely outwardly beneath the inwardly curved portion of said car body, extending fore and aft between the wheel wells of said body, and a pair of flexible end plates each disposed transversely to the vehicle and secured at its lower edge to one end of said step member and extending upwardly into the associated wheel well.

3 Claims, 5 Drawing Figures

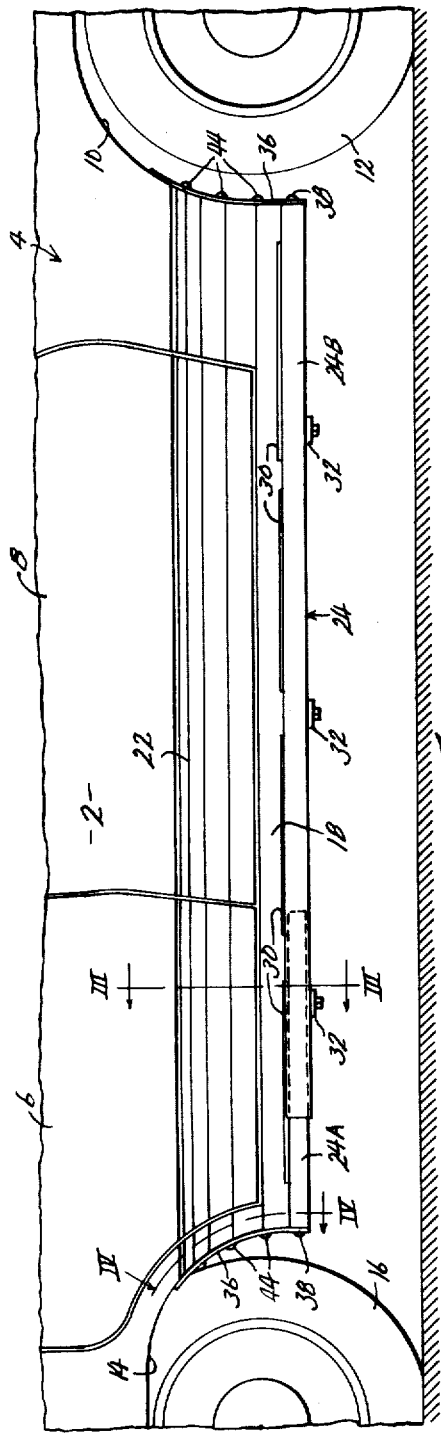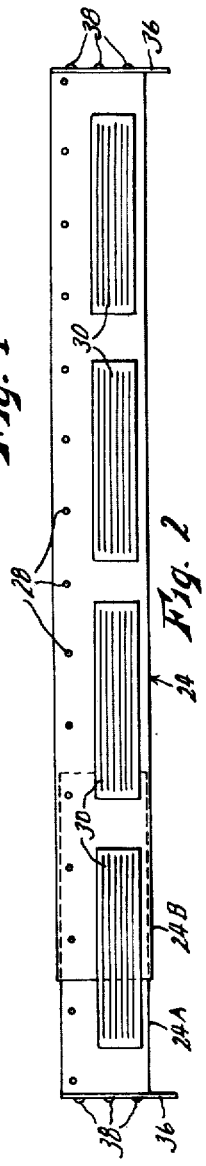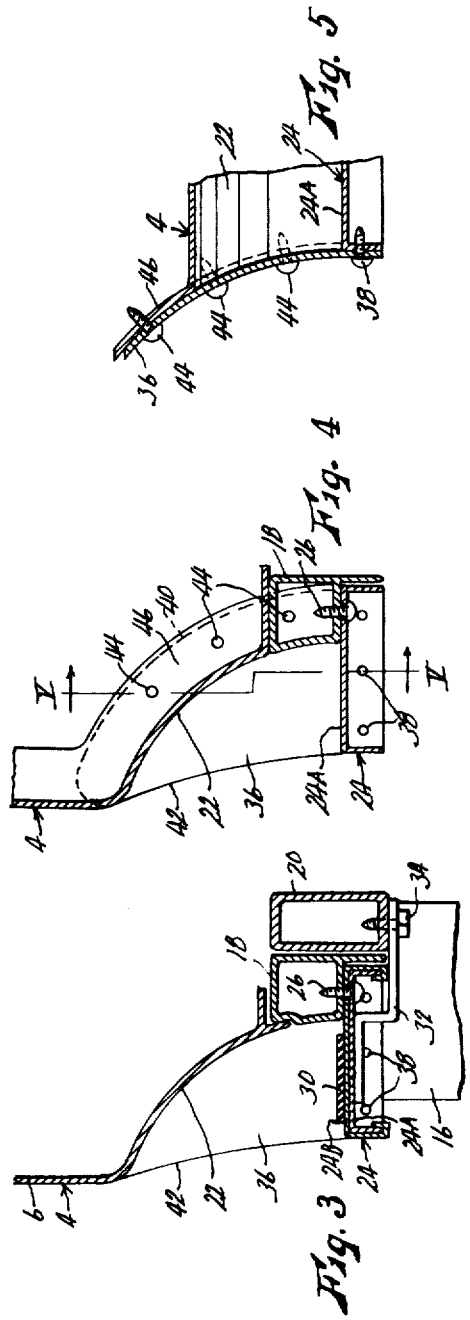
INVENTOR.
Ray S. Pierce
BY John A. Hamilton
Attorney.

MUDGUARD ATTACHMENT FOR AUTOMOBILES

This invention relates to new and useful improvements in attachment accessories for automobiles, and has particular reference to a mudguard attachment operable to prevent splattering of the sides of the vehicle with mud and the like thrown up from the road surface by its own wheels.

Many modern vehicles have bodies the sides of which curve transversely inwardly at their lower edge portions, often to the point that the extreme lower edges are disposed transversely inwardly from the vertical plane of the outer faces of the vehicle tires at the respective sides of said vehicle. Thus the transversely inwardly curved portions of the vehicle body are exposed directly to mud, water, slush, gravel and the like thrown up from the road surface by the tires. Mud, water, and the like mar the appearance of the car body, and are often carried still farther up the sides of the car body by wind currents. Gravel of course damages the body finish. The prevention of these occurences is the prime object of the present invention.

Accordingly, the present invention contemplates the provision of a device adapted to be attached to an automobile to protect the lower portions of the sides of the body thereof against mud, slush, gravel, and the like thrown up by the vehicle wheels. To this end, said device includes a horizontal step member resembling a running board adapted to be affixed to the car body at the extreme lower edge thereof, beneath the laterally inwardly curved portion thereof, and to extend laterally outwardly therefrom. Said step member extends the full distance between the wheel wells of the vehicle, and a plate disposed transversely of the vehicle is affixed at its lower edge to each end of said step member, and projects upwardly into the associated wheel well, said plates thereby filling and obstructing the ends of the space between said step and the inwardly curved surface of the car body.

Another object is the provision of a mudguard attachment of the character described which is readily adjustable to fit cars of many different styles and sizes. To this end, the step member is adjustable in length to conform to the spacing between the wheel wells, and the end plates are flexible so that they conform to the curvature of said wheel wells.

Other objects are simplicity and economy of construction, and efficiency and dependability of operation.

With these objects in view as well as other objects which will appear in the course of the specification, reference will be had to the accompanying drawing, wherein:

FIG. 1 is a fragmentary side elevational view of an automobile, with a mudguard attachment embodying the present invention applied operatively thereto, FIG. 2 is a top plan view of the attachment only, FIG. 3 is an enlarged, fragmentary sectional view taken on line III—III of FIG. 1, FIG. 4 is a slightly irregular enlarged, fragmentary sectional view taken on line IV—IV of FIG. 1, and FIG. 5 is a fragmentary sectional view taken on line V—V of FIG. 4.

Like reference numerals apply to similar parts throughout the several views, and the numeral 2 applies generally to an automobile shown fragmentarily in side elevation in FIG. 1, including a body 4 having doors 6 and 8. At its forward end, body 4 is cut away to form a wheel well opening 10 in which is disposed a front wheel 12 of the car, and a rear wheel well opening 14 enclosing a rear wheel 16 is similarly formed at the rear of the body. A rocker panel 18, forming a part of the car body, extends along the lower edge of each side of the car body, extending between wheel wells 10 and 14, and a beam 20 (see FIG. 3) forming a portion of the car frame or chassis, extends parallel with said rocker panel, just inwardly thereof.

In many cars, for reasons of styling, the lower portion of each side of the car body, including any doors 6 and 8 mounted therein, is curved transversely inwardly as indicated at 22. This curvature extends along the entire distance between wheel wells 10 and 14, and may be concave as shown, or convex, or of compound or irregular shapes. Said curvature is often of such extent that the extreme lower edge of the car body is disposed inwardly from the vertical plane of the outer faces of wheels 12 and 16, as clearly shown in FIG. 3, so that the vertical plane of the lower body edge intersects the tire treads. It is particularly in such cars that mud, slush, gravel, and the like thrown upwardly by the wheels can impinge directly against curved portion 22 of the car body, with the undesirable and sometimes damaging results already discussed.

The present mudguard attachment includes a narrow, rectangular step member 24 adapted to be disposed along the extreme lower edge of the side of the car body in the manner of a running board. Said step member is formed of sheet metal, having a downwardly opening channel form. Said step must correspond precisely in its length to the spacing between wheel wells 10 and 14, and since this spacing of course varies in different cars, said step member is adjustable in length. For this purpose, it is divided into two sections 24A and 24B which are slidably telescoped together so that the step can be adjusted in length to fit virtually any automobile.

The inner longitudinal edge portion of the step member is disposed beneath the bottom wall of rocker panel 18, and may be affixed to said rocker panel by upwardly inserted sheet metal screws 26 spaced along its length. Holes 28 for these screws (see FIG. 2) may be preformed in the step, but are preferably drilled after the step has been adjusted to its correct length, in order that the holes in the telescoped portions of step sections 24A and 24B will be registered While step 24 is intended primarily as a mudguard, not as a step to assist persons in entering the car, it nevertheless does occupy the position of a running board, and hence will almost inevitably be used as a step. For this reason, the upper surface thereof is preferably protected by rubber or other tread mats 30 cemented or otherwise affixed thereto, and it is further reinforced by a series of rigid brackets 32 (see FIGS. 1 and 3) each affixed as by screw 34 to frame beam 20 and extending laterally outwardly therefrom to underlie said step.

Affixed to each end of step 24 is a plate 36 of thin, resilient metal disposed transversely of the automobile. Each of said plates is affixed at its lower edge to the associated end of the step as by sheet metal screws 38, and extends upwardly therefrom to a height at least as great as the curved portion 22 of the car body. Each plate is of such transverse width that the inner edge portion thereof is disposed within the associated wheel well, inwardly from the surface of the car body. In FIG. 4, the inner edge of a plate 36 is indicated at 40, and its outer edge at 42. The inner edge portion of the plate is secured, as by sheet metal screws 44, to the flange 46 which in most car bodies are provided around the edges of the wheel wells for purposes of reinforcement. The holes for screws 44 are preferably drilled, and said screws applied, after plates 36 have been resiliently deformed to conform to the curvature of the wheel wells. Since this curvature varies widely from car to car, again for reasons of styling, the resilience of plates 36 permits the device to be applied to cars of many different styles. The outer edge 42 of each plates 36 rises from the outer edge of step 24, and merges smoothly with the surface of the car body at the top of curvature 22 thereof, as best shown in FIGS. 3 and 4. Said plates may be originally furnished in sizes of as great as would be required for any car to which the attachment might be applied. Thus, for any car requiring plates of lesser extent, said plates can easily be trimmed to the desired size and shape with ordinary sheet metal cutters. Said plates are sufficiently thin to be trimmed in this manner. The outer edges 42 of plates 36 may be dressed and protected by flexible molding strips, not shown, applied thereover.

Thus an effective mudguard is provided. Step 24 prevents mud, slush, gravel, and the like thrown up from the road surface by wheels 12 and 16 from impinging directly against the inwardly curved portions 22 of the car body, and plates 36 fill in the ends of the space between curvature 22 and step 24, so that said mud and the like cannot pass over the ends of the step to reach surface 22.

It should be noted that the transverse depth of the concavity in the side of the car formed by curvature 22 of the car body varies from one car to another, and further that step 24 in most cases cannot be allowed to extend laterally outwardly any farther than the vertical plane of the top edge of curvature 22, since this would increase the overall width of the car. However, since step 24 is much closer to the road surface than the top edge of curvature 22, there is no need that it extend outwardly as far as curvature 22 to afford full protection. Material thrown up from the road and passing adjacent the outer edge of the step will still not hit the side of the car body. Hence a step of a fixed width is effective on many cars the depth of the curvatures 22 of which may vary over a considerably range.

While I have shown and described a specific embodiment of my invention, it will be readily apparent that many minor changes of structure and operation could be made without departing from the spirit of the invention.

What I claim as new and desire to protect by Letters Patent is:

1. A mudguard attachment for an automobile the lower portions of the sides of the body of which are curved laterally inwardly between the front and rear wheel wells thereof, said attachment comprising:
   a. a narrow elongated horizontal step member adapted to be positioned along each side of said car body at the extreme lower edge thereof, with its inner edge in engagement with said car body and projecting laterally outwardly beneath the inward curvature of said car body, said step corresponding in length to the spacing between the front and rear wheel wells of said car body and being coextensive therewith, said step being divided laterally into a plurality of sections, said sections being slidably telescoped together longitudinally of said step, whereby said step is rendered adjustable in length,
   b. means for affixing the inner edge of said step to said car body, and
   c. a pair of end plates disposed transversely to said step, each of said end plates being affixed at its lower edge to one end of said step and rising above said step whereby to enter the associated wheel well, the laterally outward rising edge of each of said end plates being disposed at or outwardly from the vertical plane of the outer edge of said step, each of said end plates serving to obstruct one end of the space between said step and the overhanging inward curvature of said car body.

2. The structure as recited in claim 1 wherein each of said end plates is deformable transversely to its plane, whereby to be conformable to the shape of the margin of its associated wheel well, and to lie snugly against said margin.

3. The structure as recited in claim 1 wherein each of said end plates is resiliently deformable transversely to its plane, whereby to be conformable to the shape of the margin of its associated wheel well, and to lie snugly against said margin, and with the addition of means operable to secure each of said end plates rigidly to said car body at the margin of its associated wheel well.

* * * * *